United States Patent
Hwang et al.

(10) Patent No.: US 7,184,419 B2
(45) Date of Patent: Feb. 27, 2007

(54) METHOD OF CONTROLLING HANDOVER IN UPLINK SYNCHRONOUS TRANSMISSION SCHEME

(75) Inventors: Seung Hoon Hwang, Seoul (KR); Jin Young Park, Gunpo-si (KR); Eun Jung Kim, Seoul (KR); So Young Lee, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 936 days.

(21) Appl. No.: 09/978,550

(22) Filed: Oct. 18, 2001

(65) Prior Publication Data

US 2002/0045451 A1   Apr. 18, 2002

(30) Foreign Application Priority Data

| Oct. 18, 2000 | (KR) | ............................. 2000-61181 |
| Jan. 16, 2001 | (KR) | ............................. 2001-02338 |
| Jul. 2, 2001 | (KR) | ............................. 2001-39288 |

(51) Int. Cl.
*H04Q 7/00* (2006.01)

(52) U.S. Cl. .................. 370/331; 370/335; 370/350

(58) Field of Classification Search ............... None
See application file for complete search history.

(56) References Cited

U.S. PATENT DOCUMENTS

| 5,790,528 | A | * | 8/1998 | Muszynski | ............... | 370/331 |
| 5,883,888 | A | * | 3/1999 | St-Pierre | ............... | 370/331 |
| 6,138,020 | A | * | 10/2000 | Galyas et al. | ............... | 455/436 |
| 6,151,311 | A | * | 11/2000 | Wheatley et al. | ............... | 370/335 |
| 6,208,871 | B1 | * | 3/2001 | Hall et al. | ............... | 455/517 |
| 6,236,860 | B1 | * | 5/2001 | Hagting et al. | ............... | 455/436 |
| 6,708,041 | B1 | * | 3/2004 | Butovitsch et al. | ............... | 455/522 |
| 2001/0046240 | A1 | * | 11/2001 | Longoni et al. | ............... | 370/503 |

FOREIGN PATENT DOCUMENTS

| EP | 0 996 304 A1 | 4/2000 |
| JP | 2000-069526 | 3/2000 |
| WO | WO 99/27740 A1 | 6/1999 |
| WO | WO 99/41850 A1 | 8/1999 |

OTHER PUBLICATIONS

TSG-RAN Working Group 1 meeting #14, "Uplink Synchronous Transmission Scheme (USTS)," Oulu, Finlang, Jul. 4-7, 2000, TSGR1#14(00)0.

TSG-RAN Working Group 1 meeting #14, "Uplink Synchronous Transmission Scheme (USTS)," Oulu, FINLAND, Jul. 4-Jul. 7, 2000, TSGR1#14(00) 0903.

Japanese Office Action dated Aug. 4, 2005.

* cited by examiner

*Primary Examiner*—Chau Nguyen
*Assistant Examiner*—Rhonda Murphy
(74) *Attorney, Agent, or Firm*—Fleshner & Kim, LLP

(57) ABSTRACT

A method of controlling a handover is disclosed that uses both a soft handover and a hard handover in an uplink synchronous transmission scheme to synchronize the reception timing between mobile stations in an area of a base station. The uplink synchronous timing of a mobile station established with respect to a first base station can be adjusted to the uplink synchronous timing of a second base station, after re-setting a radio link with the adjusted uplink synchronous information.

17 Claims, 7 Drawing Sheets

METHOD OF CONTROLLING HANDOVER IN UPLINK SYNCHRONOUS TRANSMISSION SCHEME

BACKGROUND OF THE INVENTION

1. Field of the Invention

The present invention relates to a mobile communication system and, more particularly, to a method of controlling a handover by combining both a soft handover and a hard handover in an uplink synchronous transmission scheme (USTS).

2. Background of the Related Art

Generally, an uplink synchronous transmission scheme (USTS) is used to reduce multiple access interferences using orthogonality, by controlling reception timing between mobile stations and a base station in a closed loop timing control manner.

A related soft handover manner uses a technique that a mobile station (e.g., a user equipment or a mobile terminal) communicates with a plurality of base stations and continuously maintains a communication channel during the time of the handover. Here, the soft handover manner can be applied to a softer handover between sectors.

The handover manner can generally be divided into: (1) a hard handover that terminates a communication channel of a present source base station before connecting the communication channel to a target base station; (2) a soft handover that terminates the communication channel of the source base station after connecting the communication channel to the target base station; and (3) a softer handover that performs the soft handover function between sectors in the same base station, which is divided into multiple sectors. The soft handover maintains the communication channel and concurrently connects the same communication channel to two base stations serving the handover during a constant time. The hard handover causes discontinuity for the communication channel; a new communication channel is connected after terminating the present communication channel.

FIG. 1 is a schematic block diagram of a related mobile communication system for illustrating a handover function between two base stations in an uplink channel. Referring to FIG. 1, the related mobile communication system includes a radio network controller 101 for selecting an optimized frame on the basis of a received radio frame, a mobile station 102, and more than one base station 103 or 104. The radio network controller 101 includes a selector 101a for selecting the optimized radio frame.

A transmission signal of the mobile station 102 is concurrently received at the source base station 103 and the destination base station 104 in the uplink channel. Handover is performed in the related mobile communication system when the provisioning of service for the mobile station 102 is moved from a cell area of the source base station 103 to a cell area of the destination base station 104.

The source base station 103 and the destination base station 104 demodulate the transmission signal received from the mobile station 102 and then forward it to the radio network controller 101 with the radio frame. Then, the radio network controller 101 can select the optimized transmission signal on the basis of each respective transmission signal. Accordingly, the radio network controller 101 can be connected to the mobile station 102 via the communication channel of the base station corresponding to the optimized transmission signal.

Meanwhile, the softer handover serves the same operation as the soft handover function described above, if the mobile station 102 is moved from one sector to another sector in the service area of the base station. That is, in case of the softer handover, the two signals received from the mobile station 102 are demodulated in the source base station 103 or the destination base station 104 and then one of the two demodulated transmission signals is forwarded to the base station subsystem 101.

FIG. 2 is a block diagram of a related mobile communication system illustrating the soft handover function between two base stations controlled by the same radio network controller. Referring to FIG. 2, the related mobile communication system includes a core network 201, a mobile station 220, and a UMTS radio connection network 210 connected between the core network 201 and the mobile station 220. The UMTS radio access network 210 is a generic term for the related radio network controller(s) and base station(s). The UMTS radio access network in FIG. 2 includes a serving radio network controller (SRNC) 211 and at least a base station 212 or 213 connected with the SRNC 211. The SRNC 211 manages the dedicated radio resources allocated to the mobile station 220. If the mobile station 220 is moved from the service area of a source base station 212, which refers to the base station that is providing service to the mobile station, in an area of the SRNC 211 to the service area of a target base station 213, the source base station 212 and the target base station 213 demodulate the transmission signal received from the mobile station 220 and then transmit the demodulated signal to the SRNC 211 with the radio frame form, respectively. The SRNC 211 selects the optimized transmission signal on the basis of the respectively received transmission signal and thereby continuously maintains the communication by concurrently connecting the communication channel for the mobile station 220 to the two base stations 212 and 213 in the area where the cell service areas of the source base station 212 and the target base station 213 overlap.

FIG. 3 is a block diagram of the related mobile communication system serving the soft handover between two base stations when radio network controllers controlling at least two more base stations are different from each other. Referring to FIG. 3, although the mobile communication system is very similar to the system shown in FIG. 2, a drift radio network controller (DRNC) 312 has been added in the UMTS radio access network 310. Also, the mobile communication system includes at least two radio network controllers 312 and 316 which control the transmission signal received from the mobile station 220. These two radio network controllers 312, 316 are different from each other. The SRNC 316 and the DRNC 312 are linked to base stations 313 or 317 that can be controlled, respectively. FIG. 3 shows the related mobile communication system serving the soft handover function from the cell area of the source base station 317, controlled by the SRNC 316, to the cell area of the target base station 313 controlled by the DRNC 312. Accordingly, if the mobile station 220 moves away from the cell area of the source base station 317 toward the cell area of the target base station 313, the mobile station 220 can concurrently maintain the communication channel for each base station 313 and 317 as a result of a communication channel between the SRNC 316 and the DRNC 312. Initially, the SRNC 316 manages the dedicated radio resources allocated to the mobile station 220 and the DRNC 312 can provide the radio resources to the mobile station 220 when the mobile station 220 is moved from the cell area of the first base station 317 to the cell area of the second base station 313.

FIG. 4 is a flow chart illustrating the handover control procedure for the related soft handover. Referring to FIG. 4, the method of controlling the handover can be applied to the case of controlling the handover when the mobile station 102 is moved from the source base station 103 to the target base station 104, as shown in FIG. 1. Also, the method can be applied to the case in which the radio network controller(s) controlling each base station is/are the same or different each other.

Initially, the communication channel of the mobile station is connected only through the source base station, when the mobile station is within the service area of the source base station. But, if the mobile station enters the area overlapped by the service cell areas of the source base station and the target base station, thereby initiating the handover (step 401), the mobile station connects the communication channel not only to the source base station but also to the target base station.

As described above, the mobile station periodically measures the strength of a pilot signal received from at least one base station and transmits the measured value to the radio network controller via the base station. Then, the radio network controller selects an optimized pilot strength on the basis of the measured values. The radio network controller can connect to the communication channel with the base station in which the optimized pilot strength has been measured by the mobile station. Accordingly, the mobile station measures the pilot strengths of the source base station and the target base station (step 403) and determines whether the pilot strength measured in the target base station exceeds a predetermined pilot reference value. If the measured pilot strength exceeds the pilot reference value, then the mobile station transmits the measured results of the source base station and the target base station to the radio network controller. Additionally, the target base station is identified in a candidate list for serving the handover (step 405).

The radio network controller determines whether to control the handover based on the measurements of the pilot strengths of the source and the target base stations. If it is determined that the pilot strength of the target base station is sufficient, then the radio network controller transmits the first handover message to the mobile station to set up the communication channel with the target base station. That is, if the radio network controller transmits the first handover message to the mobile station, the mobile station starts communicating with the target base station on the basis of the first handover message via a new communication channel. Here, the first handover message includes a PN offset of the target base station and newly allocated Walsh codes. Accordingly, the mobile station transfers the target base station from the candidate list onto an actual communication list and transmits a handover completion message to the radio network controller, after obtaining a synchronization of a downlink communication channel defined in the first handover message. Thus, the mobile station communicates with both the source base station and the target base station (steps 407 and 409).

According to the description above, the communication channel is established between the mobile station and the target base station by the first handover message of the radio network controller, when the mobile station enters to the cell area of the target base station. Meanwhile, the mobile station periodically measures the pilot strengths of the source base station and the target base station (step 411 step) and determines whether the pilot strength of the source base station is enough or not (step 413). That is, the mobile station determines whether the pilot strength of the source base station is less than a pilot extracting reference value. The mobile station starts measuring the pilot strength of the source base station to determine if it is less than the pilot extracting reference value. If the pilot strength reaches the predetermined extracting threshold value, the mobile station transmits the pilot strength-measuring message to the radio network controller. So, the mobile station receives the second handover message from the radio network controller (step 415).

The mobile station deletes the source base station from the actual communication list on the basis of the received second handover message and transmits the handover completion message to the radio network controller (step 417). Here, the second handover message only includes a PN offset for the target base station and does not include the PN offset for the source base station. As described above, the method of releasing the communication channel of the source base station is explained in the case where the pilot strength of the source base station is less than the pilot extracting reference value.

FIG. 5 is a time sequential chart illustrating the data flow procedure for protocol entities of each communication element, when the related soft handover is performed. FIG. 5 illustrates the data flow procedure in the case where different radio network controllers, controlling at least one base station, are in operation. Also, the same procedure can be applied to the case where more than one base station is controlled by the same radio network controller. That is, the description for the data flow procedure of FIG. 5 can be clearly understood with reference to FIG. 3.

Referring to FIG. 5, the data flow procedure can be classified into a radio link adding procedure (step 420) and a radio link deleting procedure (step 433). Each procedure will be explained in detail below. Here, step 420 explains establishing the communication channel through the radio link between the target base station 327 and the mobile station 329 when the handover is performed, while step 433 explains releasing the radio link established between the source base station (SRNS-base station) 325 and the mobile station 329.

In step 420, if the mobile station 329 enters into a handover area, the serving radio network controller (SRNC) 321 decides whether to set up a new link between the mobile station 329 and a target base station (DRNS-base station) 327 (step 419). Here, the handover area means an area overlapped by cell areas of the source base station 325 and the target base station 327, as described above. Of course, the SRNC 321 has to be operated to receive the resulting pilot strengths measurements from the source base station 325 and the target base station 327 before performing step 419. Accordingly, the SRNC 321 can decide to set up the new link on the basis of the measured results.

If it is necessary to establish the new link between the mobile station 329 and the DRNS-base station 327 as a result of the decision, the SRNC 321 transmits a radio link setup request message to the DRNC 323 by using a Radio Network Subsystem Application Part (RNSAP), which is an interfacing protocol between the radio network controllers (step 423). The radio link setup request message includes a command for establishing the new radio link. The DRNC 323 transmits the radio link setup request message to the DRNS-base station 327 using a Node B Application Part (NBAP), which is a protocol between the base station and the radio network controller (step 423). "Node B" represents a base station.

The DRNS-base station 327 transmits a radio link setup response message to the DRNC 323, using the NBAP protocol, after successfully establishing the radio link with the mobile station 329 and on the basis of the radio link setup request message (step 425). Here, the radio link setup response message includes a report of successfully establishing the radio link between the mobile station 329 and the DRNS-base station 327. The DRNC 323 transmits the radio link setup response message to the SRNC 321 by using RNSAP protocol (427 step).

Subsequently, the SRNC 321 transmits an active set update command message to the mobile station 329 using the radio resource control (RRC), which is an interface protocol used between the mobile station and the radio network controller. Then, the mobile station 329 can add the DRNS-base station 327 to an active set on the basis of the active set update command message (step 429). Here, the active set means a group of base stations that are communicating with the mobile station through the same downlink communication channel. The mobile station 329, after adding the DRNS-base station 327 to the active set, transmits an active set update complete message to the SRNC 321 by using the RRC protocol (step 431).

Next, in step 433, if the mobile station 329 moves away from the handover area and enters a cell area of the DRNS-base station 327, the SRNC 321 decides whether to remove a predetermined radio link (step 435). Here, the predetermined radio link means a communication channel between the SRNS-base station 325 and the mobile station 329. Of course, the measured value of the pilot signal, for the SRNS-base station 325, that is measured at the mobile station 329 has to be transmitted to SRNC 321 before performing step 433. Accordingly, the SRNC 321 can decide whether to remove the radio link established at the SRNS-base station 325 based on the measured signal value of the SRNS-base station 325.

As a result, in the case of removing the radio link established on the SRNS-base station 325, the SRNC 321 transmits the active set update command message to the mobile station 329 using the RRC protocol (step 437). The mobile station 329 removes the radio link established on the present SRNS-base station from the active set on the basis of the active set update command message received from the SRNC 321 and transmits an active set update complete message to the SRNC 321 using the RRC protocol (step 439).

The SRNC 321 transmits a radio link deletion request message to the currently serving SRNS-base station 325 using the NBAP protocol (step 441). Then, the serving SRNS-base station 325 releases the radio link between the serving SRNS-base station 325 and the mobile station 329, according to the radio link deletion request message, and transmits a radio link deletion response message to the SRNC 321 using the NBAP protocol (step 443).

It is noted that the remaining steps, after excluding steps 421 to 427, may be the same used if more than one base station is controlled by the same radio network controller. That is, the command of the SRNC is directly transmitted to the SRNS-base station 325 without passing through the DRNS-base station as shown in steps 421 to 427, since the DRNS-base station 327 does not exist in the case where more than one base station is controlled by the same radio network controller.

As described above, the related art method for controlling the handover does not consider a transmission scheme that is provided to improve performances of the uplink in the base station, i.e., an uplink synchronous transmission scheme for synchronizing the reception timing between the mobile stations. That is, the related handover is served without considering the transmission scheme for controlling the reception timing of the mobile stations by using the closed loop timing control scheme in the base station.

Accordingly, in order to improve the method of controlling the handover, a hard handover means of the uplink synchronous timing essentially required in the uplink synchronous transmission scheme should be added together with the related art soft handover method. In the present invention, it should be noted that the hard handover of the uplink synchronous timing is used instead of the soft handover, since only one of the base stations is selected, because synchronizing the uplink synchronous timing for the source base station and the target base station cannot occur at the same time.

If the hard handover of the uplink synchronous timing is not considered, there are problems of not utilizing the uplink synchronous transmission scheme function and decreasing the reception capacity and cell coverage areas due to a failure in maintaining the uplink synchronous transmission gain by moving the mobile station between the sectors or base stations.

In the long run, it is expected that a new method of controlling the handover, wherein the hard handover manner controlling the synchronous timing is used in conjunction added with the related soft handover manner, will supplement the related art method in the field.

SUMMARY OF THE INVENTION

An object of the invention is to solve at least the above problems and/or disadvantages and to provide at least the advantages described hereinafter.

It is another object of the present invention to solve the aforementioned problems in the related art by providing a method of controlling a handover using an uplink synchronous transmission scheme, while using the related art mobile communication system.

It is still another object of the present invention to provide a method of controlling a handover for an uplink synchronous transmission scheme that can control an uplink synchronous timing by combining the present soft handover manner for NON-USTS link addition and/or deletion with the hard handover manner for controlling uplink synchronizing timing.

It is a further object of the present invention to provide a method of controlling a handover for an uplink synchronous transmission scheme which can define a data flow between physical layers of each communication element when the handover is served.

To achieve one or more of the above objects, there is provided a method of controlling a handover using an uplink synchronous transmission scheme in a mobile communication system in which a first base station and a second base station are controlled by a radio network controller. The mobile station concurrently transmits and receives communication data of an identical signal to/from the first and second base stations. The method comprises transmitting information for the uplink synchronous transmission to the first and the second base stations; resetting a radio link on the basis of the information for the uplink synchronous transmission; and adjusting an uplink synchronous timing controlled by a base station on the basis of the reset radio link to the uplink synchronous timing of another base station.

It is desired that the information for the uplink synchronous transmission is an indicator of the uplink synchronous transmission scheme, a scramble code of the uplink synchronous transmission scheme, or a channelizing code number of the uplink synchronous transmission scheme.

However, if the base stations are controlled by different radio network controllers, the method further comprises transmitting the information on the uplink synchronous transmission from a radio network controller to another radio network controller; resetting the radio link on the basis of the information for the uplink synchronous transmission transmitted from the radio network controller or the other radio network controller; and adjusting an uplink synchronous timing of the mobile station, which is controlled by the base station under the control of the radio network controller, on the basis of the reset radio link with the uplink synchronous timing of the base station controlled by the other radio network controller.

Also, to achieve one or more of the above objects, there is provided a method of changing a base time for an uplink synchronous transmission scheme in a mobile station of a mobile communication system in which a first base station and a second base station, which are controlled by a radio network controller, receive communication data of an identical signal from a mobile station simultaneously. The method comprises transmitting communication data to the first base station; checking pilot signals from the second base station; transmitting communication data to the second base station; checking pilot signals from the first and second base station; and changing the base time for uplink synchronous transmission scheme to the base time of the second base station.

The objects of the invention may be further achieved in whole or in part by a method of controlling a handover of a communication link, including measuring a first communication characteristic between a common terminal and a target terminal; establishing a synchronous communication uplink between the common terminal and the target terminal, the synchronous communication uplink established in accordance with a timing adjustment value derived from the first communication characteristic measurement; and transitioning communication service support for the common terminal from a current terminal to the target terminal, using the synchronous communication uplink.

The objects of the invention may be further achieved in whole or in part by a system for managing a handover of a communication link. The system includes a common terminal that communicates with both a target terminal and a current terminal and measures a communication characteristic between the common terminal and the target terminal. Additionally, the system includes a network controller that manages the operation of the current terminal and the target terminal. The network controller establishes a synchronous communication uplink between the common terminal and the target terminal based on a timing adjustment value derived from the communication characteristic measurement and transitions communication service support for the common terminal from the current terminal to the target terminal, using the synchronous communication uplink.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
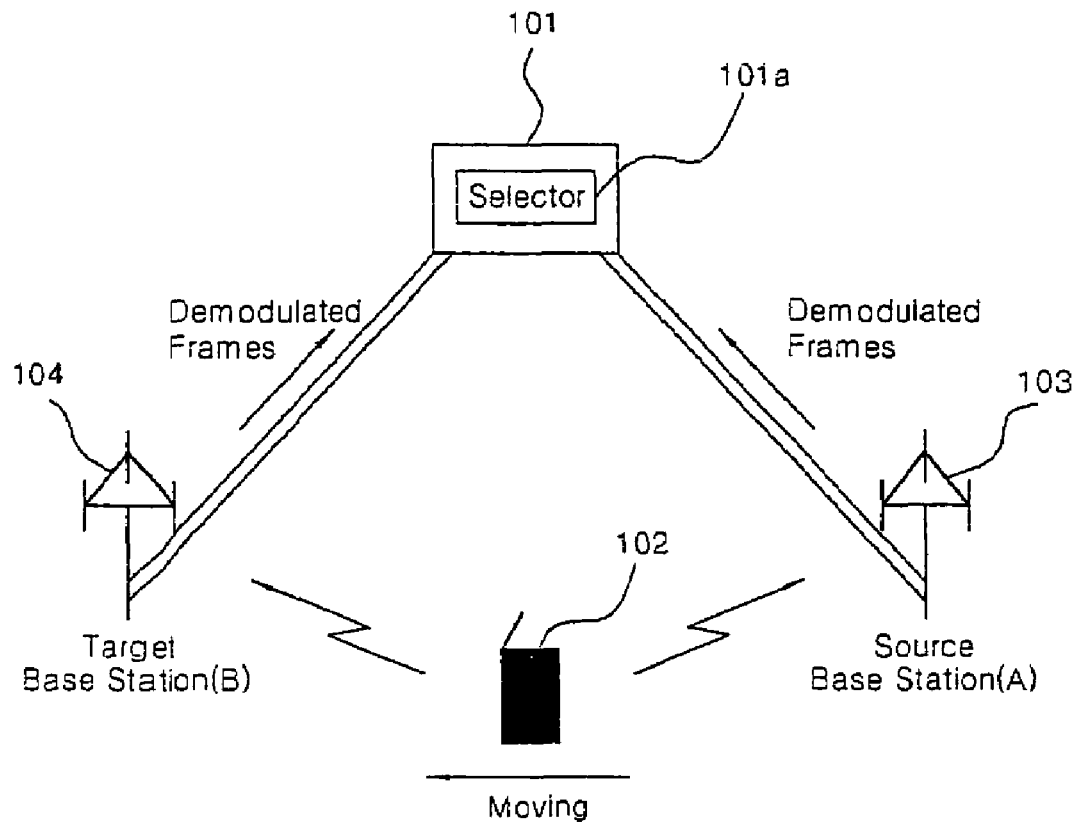
FIG. 1 illustrates a schematic block diagram of a related mobile communication system showing a handover function between two base stations in an uplink channel.
Figure 2:
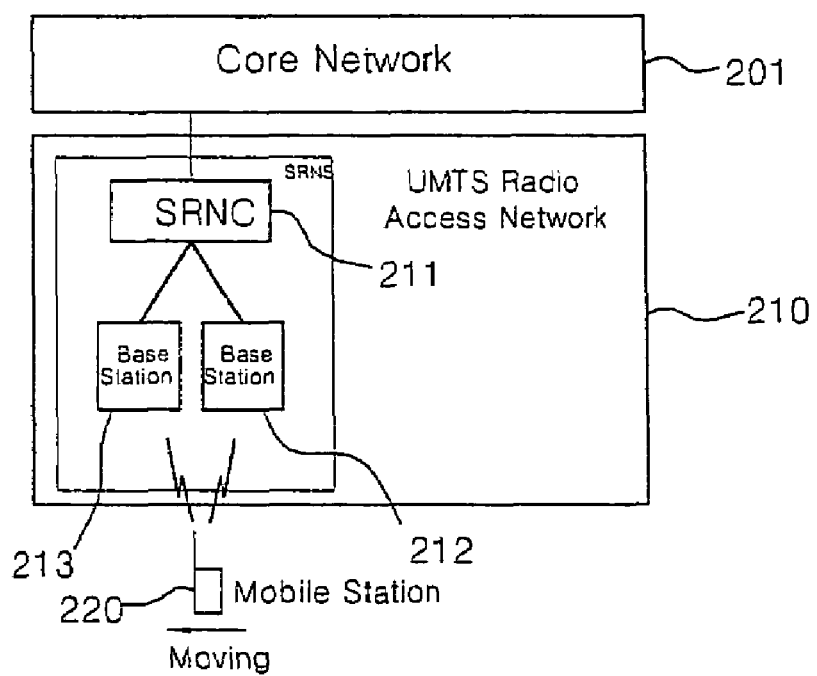
FIG. 2 illustrates a block diagram of a related mobile communication system showing a soft handover function between two base stations in a radio network controller that controls at least two base stations.
Figure 3:
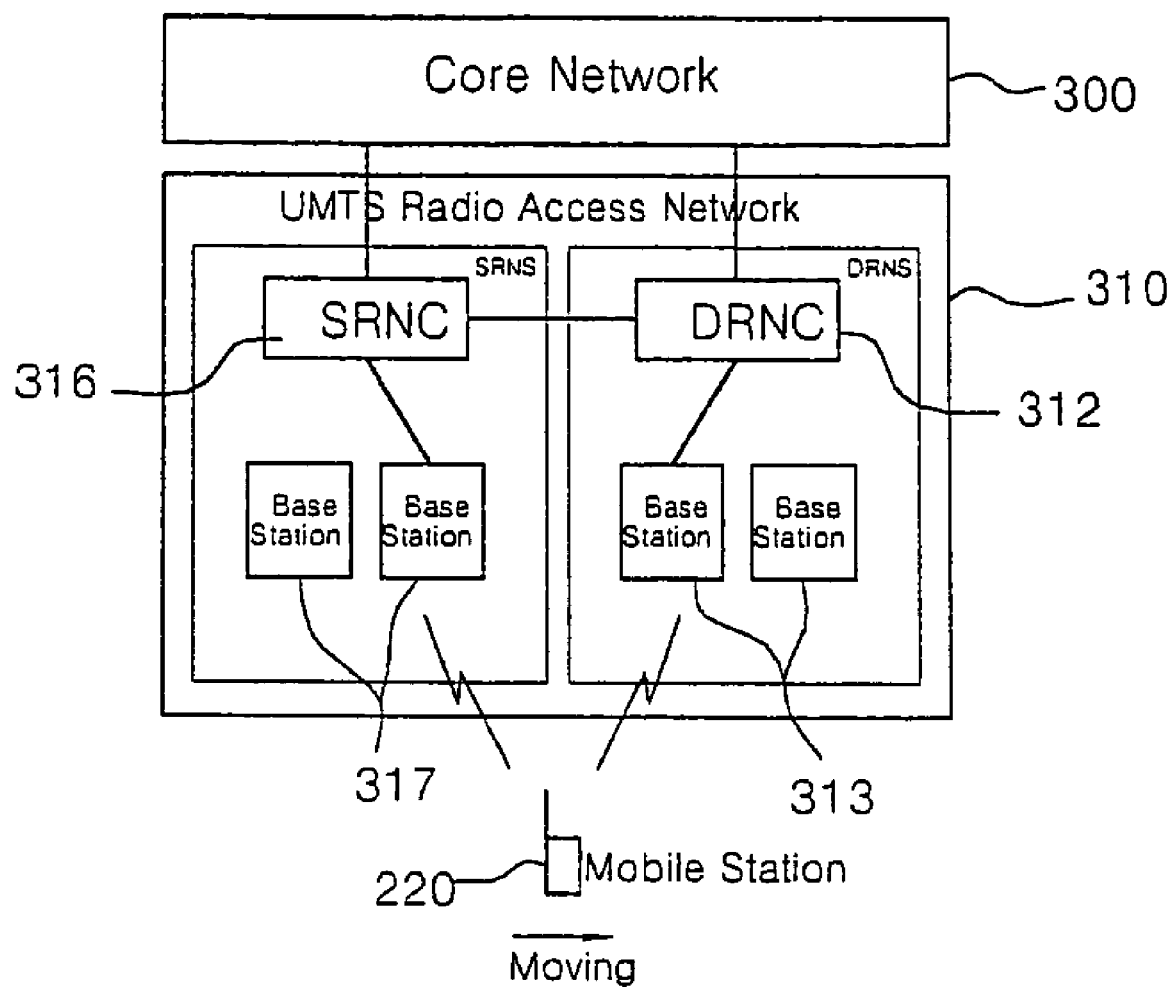
FIG. 3 illustrates a block diagram of a related mobile communication system showing a soft handover function between two base stations of two separate radio network controllers.
Figure 4:
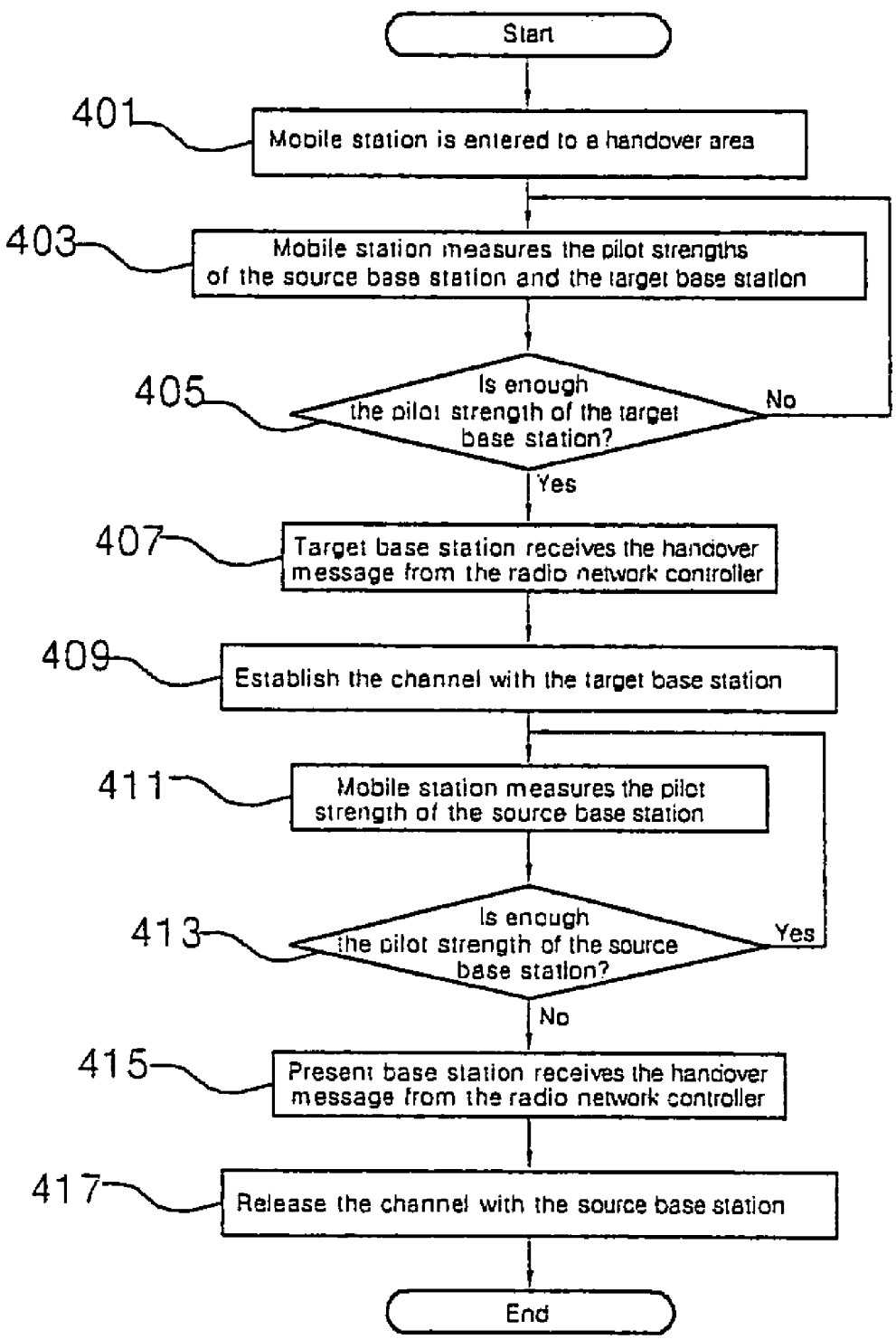
FIG. 4 illustrates a flow chart of the handover control procedure for a related soft handover.
Figure 6:
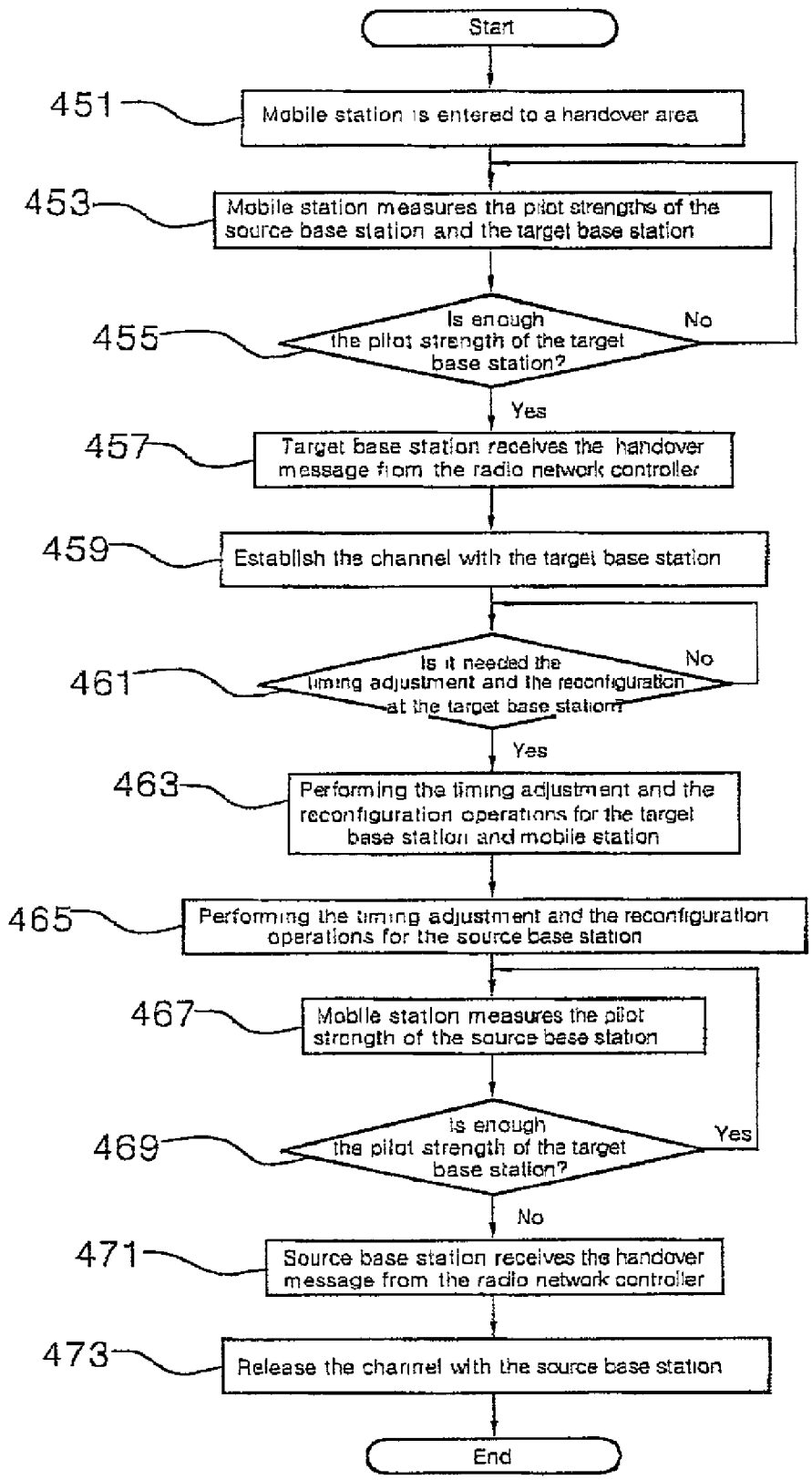
FIG. 6 illustrates a flow chart of the procedure of controlling a signal timing of a mobile station when the soft handover is performed according to a preferred embodiment of the present invention.

FIG. 6 is a flow chart illustrating the procedure of controlling the signal timing of the mobile station when the soft handover is performed according to a preferred embodiment of the present invention. FIG. 6 further illustrates a method of controlling the handover by combining a soft handover with a hard handover for controlling a transmission signal timing of a mobile station in an uplink. Also, the method of the present invention can be applied in the case where the radio network controllers for controlling each base station are either the same or different from each other. The following detailed explanation will emphasize the method of controlling the hard handover, since establishing or releasing the radio link is the same as the operation of the related art, as shown in FIG. 4. The soft handover is different only when additionally used to serve the hard handover.

Initially, the mobile station is positioned in the service area of the source base station, alone. Therefore, the communication channel of the mobile station is connected only to the source base station. If the mobile station enters into an area overlapped by the cell areas of the source base station and the target base station, thereby initiating the handover (step 451), the mobile station measures strengths of pilot signals received from both the source base station and the target base station (step 453). And, the mobile station judges whether the pilot strength measured in the target base station is greater than a predetermined pilot reference value (step 455). The mobile station then transmits the resulting measurements of the source base station and the target base station to the radio network controller and registers the target base station onto a candidate list for serving the handover, according to the resulting measurement. If the intensity of the pilot signal of the target base station exceeds the threshold, based on the predetermined pilot reference value, then the communication data are transmitted to the target base station.

Meanwhile, the target base station receives the first handover message from the radio network controller (step 457) and sets up the communication channel with the mobile station according to the first handover message (step 459). Detailed descriptions of steps 451 to 459 will be omitted since they are almost the same as the method of controlling the handover of the related art, as shown in FIG. 4.

Consequently, both the source base station and the target base station have established the communication channel with the mobile station. That is, the source base station is set up as a USTS mode, while the target base station is set up with a NON-USTS mode. Therefore, the source base station maintains the timing between transmission signals of the mobile station through the USTS mode in the uplink synchronous transmission scheme, while the target base station establishes the timing between transmission signals of the mobile station in the NON-USTS mode. At this time, the radio link is established either between the mobile station and the source base station or between the mobile station and the target base station.

Meanwhile, the radio network controller compares the radio link quality transmitted from the mobile station and determines whether to perform the timing adjustment and the reconfiguration operations using the target base station, based on the comparison result (step 461). The determination process can be performed using the link quality and the numbers of the mobile stations.

In the case of using the link quality, the radio network controller compares the link quality of the source base station with the link quality of the target base station. If the link quality of the target base station is better than that of the source base station, then the radio network controller transmits the handover control command to the mobile station and the target base station, respectively.

In the case of using the number of the mobile stations, the radio network controller compares the number of the mobile stations transmitting in the uplink synchronous transmission for the source base station with the number of the mobile stations transmitting in the uplink synchronous transmission for the target base station. If the number of the mobile stations transmitting in the uplink synchronous transmission for the source base station are more than the number in the uplink synchronous transmission for the target base station, the base station transmits the handover control command to the mobile station and the target base station, respectively. However, it is preferable that both the link quality and the quantity of the mobile stations are used for the above determination.

If the target base station is selected for performing the timing adjustment and the reconfiguration operations as a result of step 461, the target base station performs the operation using the second handover message, after receiving the handover control command from the radio network controller (step 463). Also, the radio network controller transmits the second handover message to the source base station and, thereby, the source base station performs the timing adjustment and the reconfiguration based on the second handover message (step 465). It should be noted that the transmission signal of the mobile station is synchronized at the target base station as a result of steps 463 and 465, not synchronizing by the reception timing at the source base station. Consequently, the source base station is converted into the NON-USTS mode and the target base station is converted into the USTS mode. Accordingly, the interference between the received signals is removed at the target base station, with respect to the related art method of receiving the transmission signal of the mobile station transmitted by the nonsynchronous type hard handover, thereby improving the reception performance of the base station.

Meanwhile, the mobile station periodically measures the pilot strength of the source base station (step 467) and determines whether the pilot strength of the source base station is enough (step 469). The mobile station transmits the pilot strength measurement message to the radio network controller according to the results. Thereafter, the mobile station receives the third handover message from the radio network controller (step 471). Then the mobile station deletes the source base station from the actual communication list, according to the third handover message, and transmits the handover completion message to the radio network controller (step 473).

When the mobile station moves from the cell area of the source base station to the target base stations, the decision to establish a new radio link with the target base station depends on the results of the pilot strengths measured for both the source and the target base stations. Further, determining whether to synchronize the transmission signal of the mobile station by the synchronous timing of the target base station depends on the link quality and the number of the mobile stations. The hard handover message is transmitted to the mobile station and the target base station to synchronize with the target base station, when the synchronous timing of the target base station has been selected.

Figure 7:
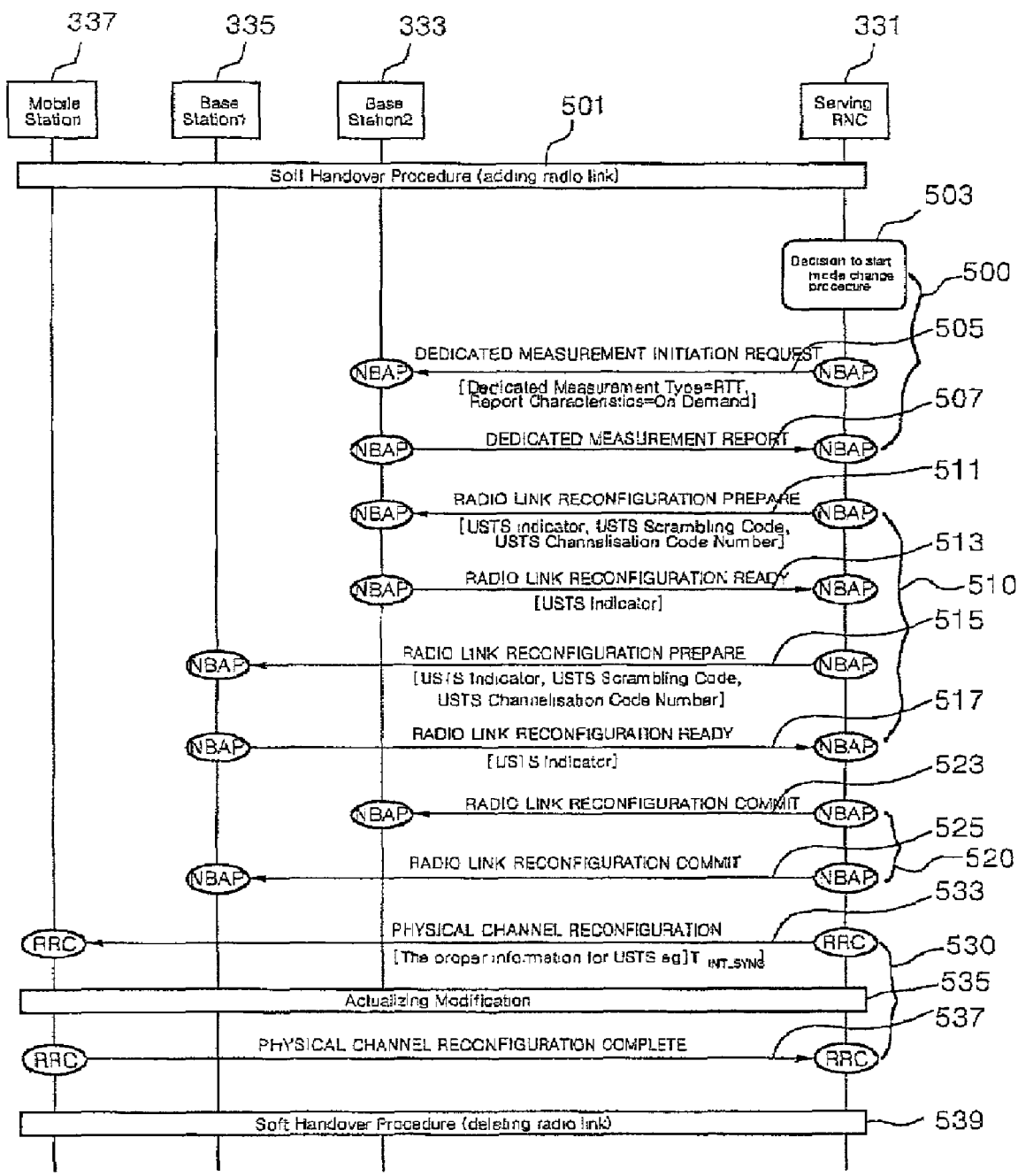
FIG. 7 illustrates a time sequential chart of the data flow procedure for protocols of each communication element, according to a preferred embodiment of the present invention.

FIG. 7 is a time sequential chart illustrating the data flow procedure for protocols of each communication element for controlling the signal timing of the mobile station, when a radio network controller controlling at least two base stations performs the soft handover according to a preferred embodiment of the present invention. Referring to FIG. 7, the mobile communication system includes a mobile station 337, the first base station 335 as a source base station, the second base station 333 as a target base station, and a serving RNC (SRNC) 331 as a radio network controller. FIG. 7 illustrates forwarding orders of control commands between the communication elements in the case of serving the handover by using the USTS mode.

The data flow shown in FIG. 7 can be classified into 1) a soft handover procedure for setting the radio link in the target base station 333 as shown in step 501, 2) a hard handover procedure for converting the synchronous mode, and 3) a soft handover procedure for releasing the radio link of the source base station 335 as shown in step 539.

Figure 5:
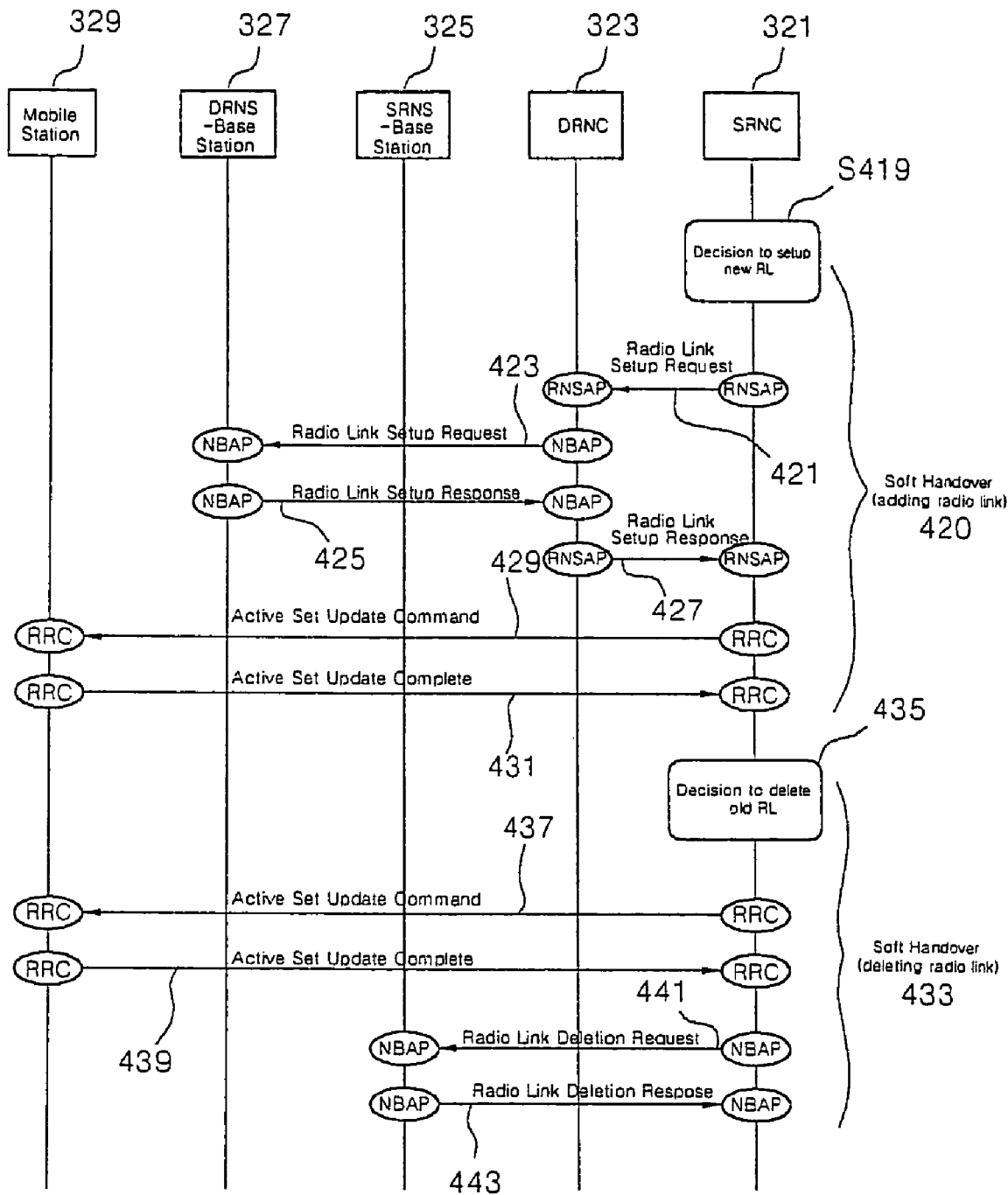
FIG. 5 illustrates a time sequential chart of the data flow procedure for protocols of each communication element when a related soft handover is performed.

First, the soft handover procedure for setting the radio link in the target base station 333 will be explained. If the mobile station 337 enters into a handover area, i.e., entering from the cell area of the current source base station 335 to the target base station 333, the soft handover is initiated as illustrated in step 420 of FIG. 5, thereby setting the radio link of the target base station 333 (step 501). Here, the setting of the radio link is achieved as the radio network controller 331 requests for setting up the radio link to the target base station 333. And when the message indicating that the radio link setup has been successively accomplished is received from the target base station 333, the radio network controller 331 sends a request for an update of an active setup to the mobile station 337. The process is completed when a response indicating that the target base station 333 has been added onto the active set by the mobile station 337 is received by the radio network controller 331.

Second, the hard handover procedure for converting the synchronous mode will be explained. The radio network controller 331 decides whether to start the mode change operation after adding the radio link of the target base station 333 (step 503). Here, the mode change operation indicates the operation of converting the transmission signal of the mobile station 337 into the USTS mode or the NON-USTS mode (i.e., the synchronous mode of the source base station 335 or the target base station 333 is converted). For example, the base station is set to the USTS mode in the case of the synchronous mode, while the base station is set to the NON-USTS mode in the case of the non-synchronous mode.

In the case of starting the mode change procedure, the hard handover procedure includes: (1) a measuring procedure (step 500); (2) a mode change procedure for each base station (step 510); (3) a radio link activation procedure (step 520); and (4) a synchronization and reconfiguration procedure (step 530).

First, referring to the measuring procedure (step 500), the radio network controller 331 decides whether to perform the hard handover with the synchronous timing of the target base station, by measuring and comparing the signal quality of the mobile station for the up and down links, and then obtains the synchronous timing of the target base station through a dedicated measurement procedure. Accordingly, the radio network controller 331 transmits a dedicated measurement initiation request message to the target base station 333 using the NBAP protocol (step 505). Here, the dedicated measurement initiation request message includes a dedicated measurement type element (e.g., Round Trip Time (RTT) parameter) and report characteristics element (e.g., On Demand parameter). The On Demand parameter is used for performing and reporting the measurement as soon as the base station receives the dedicated measurement initiation request message, while the RTT parameter is used to represent the time elapsed while transmitting the downlink dedicated physical channel (DPCH) frame from the base station to the mobile station and receiving the uplink DPCH frame from the mobile station. Here, the measured value by the RTT parameter is for synchronizing the uplink in the event that the USTS is used later.

The target base station 333 performs the RTT measurement by a parameter which is included in the dedicated measurement initiation request message and then transmits the measurement results to the radio network controller 331 using the NBAP protocol (step 507).

Second, the mode change procedure (step 510) of each base station will now be explained. The mode change procedure is that the radio network controller 331 reconfigures the radio link between the target base station 333 and the mobile station 337 into the USTS mode using a new timing and codes based on the timing information measured by the measuring procedure (step 500). The procedure also reconfigures the radio link between the source base station 335 and the mobile station 337 into the NON-USTS mode.

In the communication system applied to the USTS, operational modes are classified into (1) a normal mode used in the mobile station and the base station in which the USTS is not served, (2) the USTS mode controlling the transmission timing by the USTS due to serve the USTS, and (3) the NON-USTS mode not controlling the transmission timing by the USTS, but serving the USTS. Accordingly, the present invention serves both the USTS and the NON-USTS modes, since the base station and mobile station serving with the USTS are used. That is, one base station is operated with the USTS mode and the other base station is operated with the NON-USTS, in the case where at least one mobile station exists in a soft handover area overlapped by the cell areas of at least two base stations and the two base stations serve the USTS. The reason is one mobile station cannot operate with two base stations in the USTS mode at the same time and the uplink synchronous transmission timing is synchronized with only one base station. Therefore, the communication between the mobile station and the base station can be established in the USTS mode. Even if the USTS is used between the mobile station and the base station, in the NON-USTS mode, the uplink synchronization could not be performed.

First, the radio network controller 331 transmits a radio link reconfiguration prepare message to the target base station 333 by using the NBAP protocol (step 511). Here, the radio link reconfiguration prepare message includes a USTS indicator, a USTS scrambling code, and a USTS channelization code number.

The target base station 333 reconfigures the radio link on the basis of the radio link reconfiguration prepare message and transmits a radio link reconfiguration ready message to the radio network controller 331, using the NBAP protocol, when the reconfiguration of the radio link is completed (step 513). The radio link reconfiguration ready message includes the USTS indicator. At this time, the synchronous mode of the radio link of the target base station is selected by the USTS mode.

And, the radio network controller 331 transmits the radio link reconfiguration ready message to the source base station 335 using the NBAP protocol (step 515). Here, the radio link reconfiguration ready message includes the USTS indicator, the USTS scrambling code, and a USTS channelization code number. Then, the source base station 335 reconfigures the radio link on the basis of the radio link reconfiguration ready message and transmits the radio link reconfiguration ready message to the radio network controller 331, using the NBAP protocol, when the reconfiguration of the radio link is completed (step 517). The source base station 335 has been communicating with the mobile station 337 by the USTS mode. But, the present USTS mode is converted into the NON-USTS mode by the radio link reconfiguration command.

Second, the radio link activation procedure (step 520) will be explained. The radio network controller 331 transmits a radio link reconfiguration commit message to the target base station 333, using the NBAP protocol, and the target base station 333 activates the radio link of the USTS mode on the basis of the radio link reconfiguration commit message (step 523). Also, the radio network controller 331 transmits the radio link reconfiguration commit message to the source base station 335, using the NBAP protocol, and the source base station 335 activates the radio link of the NON-USTS mode on the basis of the radio link reconfiguration commit message (step 525).

If the radio link of each station is activated, the synchronization and reconfiguration process (step 530) will be performed. That is, the radio network controller 331 transmits a physical channel reconfiguration message to the mobile station 337 using the RRC protocol (step 533). The mobile station 337 performs the mode change and actualizing modification by transferring the physical channel reconfiguration message to the physical channel (step 535). Here, the physical channel reconfiguration message includes the scramble code, the channelization code number, and a timing adjustment value. If the physical channel is set completely, the mobile station 337 transmits a physical channel reconfiguration complete message to the radio network controller 331 using the RRC protocol (step 537).

Accordingly, the present radio link can be reconfigured with the corresponding radio link at the target base station 333 in USTS mode as shown in step 535.

Next, if the mobile station 337 moves out of the handover area, the radio link release procedure of releasing the radio link for the source base station 335 is performed (step 539). Here, the detailed description of step 539 will be omitted, since it is the same as step 433 of FIG. 5.

Figure 8:
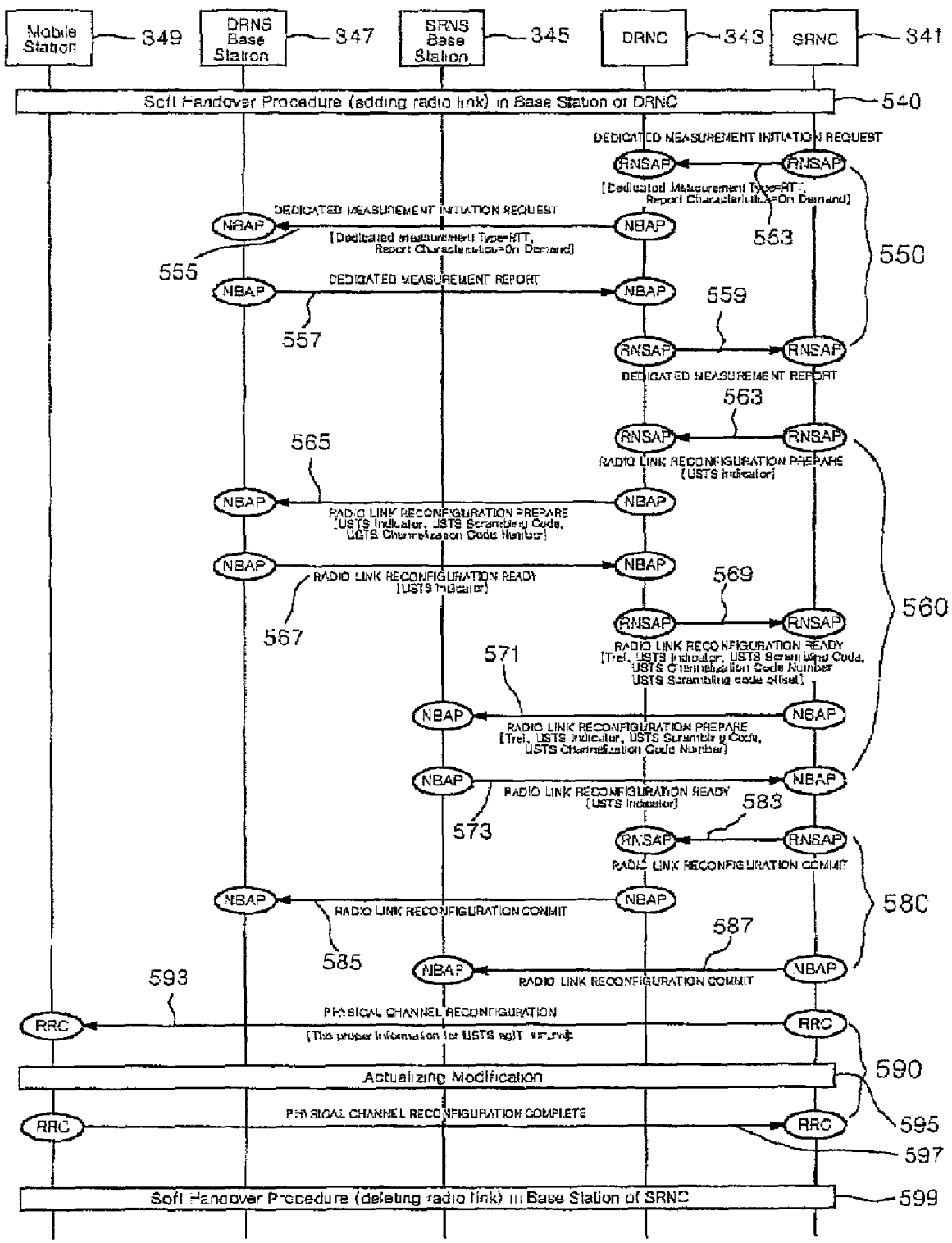
FIG. 8 illustrates a time sequential chart of the data flow procedure for physical layers, according to a preferred embodiment of the present invention.

FIG. 8 is a time sequential chart illustrating the data flow procedure between protocol entities for each communication element for controlling a signal timing of a mobile station when different radio network controllers controlling at least two more base stations perform the soft handover according to a preferred embodiment of the present invention. Referring to FIG. 8, the mobile communication system includes a mobile station 349, the first base station (DRNS base station) 347 as a target base station, the second base station (SRNS base station) 345 as a source base station, a drift radio network controller (DRNC) 343, and a serving radio network controller (SRNC) 341. FIG. 8 also illustrates forwarding orders of control commands between the communication elements in the case of serving the handover by using USTS mode.

The data flow shown in FIG. 8 can be classified into (1) a soft handover procedure for setting the radio link in the target base station, (2) a hard handover procedure for converting the synchronous mode, and (3) a soft handover procedure for releasing the radio link of the source base station, as in FIG. 7. But, the data flow of FIG. 8 differs from the detailed procedure due to the added drifting radio network controller 343 and the different serving radio network controller base station 341.

Hereinafter, the soft handover procedure (step 540) for setting the radio link in the target base station and the soft handover procedure (step 599) for releasing the radio link of the source base station (same as FIG. 7) will be omitted to avoid the repetition of description.

The hard handover procedure includes (1) a measuring procedure (step 550), (2) a mode change procedure for each base station (step 560), (3) a radio link activation procedure (step 580), and (4) a synchronization and reconfiguration procedure (step 590).

First, referring to the measuring procedure (step 550), the serving radio network controller 341 transmits a dedicated measurement initiation request message to the target base station 343 using the RNSAP protocol to obtain a synchronous timing of the target base station 347 (step 553). Here, the dedicated measurement initiation request message includes a dedicated measurement type element (i.e., Round Trip Time (RTT) parameter) and report characteristics element (i.e., On Demand parameter).

The drift radio network controller 343 transmits the dedicated measurement initiation request message to the target base station 347 using the NBAP protocol (step 555). And, the target base station 347 performs the measurement by the RTT parameter included in the dedicated measurement initiation request message and then transmits the measurement results to the drift radio network controller 343 using the NBAP protocol (step 557). The drift radio network controller 343 transmits the measurement results to the serving radio network controller 341 using the RNSAP protocol (step 559).

Second, the mode change procedure (step 510) of each base station will be explained. The serving radio network controller 341 transmits a radio link reconfiguration prepare message to the drift radio network controller 343 using the RNSAP protocol (step 563). Here, the radio link reconfiguration prepare message includes a USTS indicator. The drift radio network controller 343 transmits a radio link reconfiguration ready message to the target base station 347 using the NBAP protocol (step 565). Here, the radio link reconfiguration ready message includes the USTS indicator, the USTS scrambling code, and a USTS channelization code number.

The target base station 347 reconfigures the radio link on the basis of the radio link reconfiguration prepare message and transmits the radio link reconfiguration ready message to the drift radio network controller 343, using the NBAP protocol, when the reconfiguration of the radio link is completed (step 567). The radio link reconfiguration ready message includes the USTS indicator. At this time, the target base station 347 is set up with the radio link of the USTS mode in step 567. The drift radio network controller 343 transmits the radio link reconfiguration ready message to the serving radio network controller 341 using the RNSAP protocol (step 569). Here, the radio link reconfiguration ready message includes Tref, the USTS indicator, the USTS scrambling code, a USTS channelization code number, and a USTS scramble code offset. Tref refers to the reference timing between the target base station and the serving radio network controller.

Meanwhile, if the serving radio network controller 341 transmits the radio link reconfiguration prepare message to the source base station 345 using the NBAP protocol (step 571), the source base station 345 converts the USTS mode into the NON-USTS mode on the basis of the radio link reconfiguration prepare message. Here, the radio link reconfiguration prepare message includes the Tref, the USTS indicator, the USTS scrambling code, and the USTS channelization code number.

The source base station 345 transmits a radio link reconfiguration ready message to the serving radio network controller 341, using the NBAP protocol, when the reconfiguration of the radio link is completed (step 573 step).

Second, the radio link activation procedure (step 580) will be explained. The serving radio network controller 341 transmits a radio link reconfiguration commit message to the drift radio network controller 343, using the RNSAP protocol (step 583), and the drift radio network controller 343 transmits the radio link reconfiguration commit message to the target base station 347 using the NBAP protocol (step 585). Then, the target base station 347 activates the radio link of the USTS mode on the basis of the radio link reconfiguration commit message. Also, if the serving radio network controller 341 transmits the radio link reconfiguration commit message to the source base station 345 using the NBAP protocol (step 587), the source base station 345 activates the radio link of the NON-USTS mode.

If the radio link of each station is activated by steps 583 and 585, the serving radio network controller 341 transmits a physical channel reconfiguration message to the mobile station 349, using the RRC protocol, and the mobile station 349 reconfigures the present link with the radio link of the USTS synchronization in the target base station (step 593). That is, mobile station 349 performs the mode change and timing adjustment by transferring the physical channel reconfiguration message including the scrambling code, the channelization code, and a correct transmission timing adjusting value and so on (step 595).

If the mode change and timing adjustment is completed, the mobile station 349 transmits a physical channel reconfiguration complete message to the serving radio network controller 341, using the RRC protocol (step 597).

Next, if the mobile station 349 moves out of the handover area, the radio link release procedure releasing the radio link for the source base station 345 is performed (step 599).

As described above, the present invention provides the method of controlling the soft handover in the uplink synchronous transmission scheme by serving the soft handover adding the new radio link on the basis of the pilot strength measured from the source base station and the target base station when the mobile station is entered into the handover area, and serving the hard handover for converting each radio link mode for the source base station and the target base station, and then releasing the radio link of the source base station.

Also, the detailed data flow procedure between the protocol entities for each communication element can be provided when the hard handover for converting the mode of the uplink synchronous transmission scheme is converted in case of serving the handover.

According to the method of controlling the handover of the present invention, the handover combined with the soft handover for NON-USTS link addition and deletion and the hard handover for controlling uplink synchronization timing is performed without adding separate elements onto the related mobile communication system.

According to the method of controlling the handover of the present invention, the complicated communication elements for controlling the signal transmission timing using the uplink synchronous transmission scheme do not exist additionally and the synchronization timing for serving the handover can be controlled by the control parameters.

According to the method of controlling the handover of the present invention, the performance or the reception capacity and the cell coverage area can be increased by serving the hard handover with the uplink synchronous transmission scheme.

According to the method of controlling the handover of the present invention, the handover of the mobile station can be performed efficiently by defining the data flow between the protocol entities for each communication element.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of controlling a handover of a communication link, comprising:
    transmitting information for an uplink synchronous transmission from a radio network controller to a first base station and a second base station;
    reconfiguring a radio link between a mobile station and the second base station, based on the information for the uplink synchronous transmission;
    adjusting a base time for the uplink synchronous transmission of communication data by the mobile station to match the base time of an uplink synchronization scheme of the second base station when the mobile station moves from a first area corresponding to the first base station to a second area corresponding to the second base station;
    transmitting the information on the uplink synchronous transmission from the radio network controller to another radio netxvork controller, if the first and second base stations are controlled by different radio network controllers;
    reconfiguring the radio link based on the information for the uplink synchronous transmission transmitted from the radio network controller; and
    adjusting an uplink synchronous timing of the mobile station for the uplink synchronous transmission, on the basis of the reconfigured radio link, to match an uplink synchronous timing of the base station controlled by the another radio network controller.

2. The method of claim 1, wherein the information for the uplink synchronous transmission is an identifier of the uplink synchronous transmission scheme.

3. The method of claim 1, wherein the information for the uplink synchronous transmission is a scramble code of the uplink synchronous transmission scheme.

4. The method of claim 1, wherein the information for the uplink synchronous transmission is a channelizing code number of the uplink synchronous transmission scheme.

5. The method of claim 1, further comprising transmitting a measurement control command for measuring an uplink synchronous timing.

6. The method of claim 5, wherein the measurement control command includes a measurement type and a reporting characteristic.

7. The method of claim 1, wherein the radio link is reconfigured by converting a mode of the uplink synchronous transmission scheme.

8. A method of controUing a communication link, comprising:
    measuring a first communication characteristic between a common terminal and a target terminal;
    measuring a second communication characteristic between a current terminal and the common terminal;
    determining whether to establish a synchronous communication link between the common terminal and the target terminal based on the measured first communication characteristic and the measured second communication characteristic;
    establishing the synchronous communication link between the common terminal and the target terminal, the synchronous communication link established in accordance with a timing adjustment value derived from the first communication characteristic measurement; and
    transitioning communication service support for the common terminal from the current terminal to the target terminal, using the synchronous communication link.

9. The method of claim 8, wherein the first communication characteristic is a commurncatlon propagation time.

10. The method of claim 8, wherein the second communication characteristic is a received quality of a signal transmitted separately by the target terminal and the current terminal and received by the common terminal.

11. The method of claim 8, wherein the second communication characteristic is the amount of communication traffic supported by the target terminal and by the current terminal.

12. The method of claim 8, wherein establishing the synchronous communication link includes:
    activating a communication channel for the synchronous communication link between the target terminal and the common terminal;

synchronizing the common terminal with the synchronous communication link based on the timing adjustment value;

changing a mode of communication between the target terminal and the common terminal from an asynchronous mode to a synchronous mode; and changing a mode of communication between the current terminal and the common terminal from the synchronous mode to the asynchronous mode.

13. The method of claim 8, further comprising:

establishing a communication channel between the common terminal and the target terminal through a soft handover procedure, prior to measuring the first communication characteristic; and releasing a communication channel between the common terminal and the current terminal after transitioning the communication service support.

14. The method of claim 8, further comprising:

communicating a request from a source network controller to a target network controller for the target network controller to initiate the measurement of the first communication characteristic, wherein the source network controller manages the operation of the current terminal and the target network controller manages the operation of the target terminal.

15. A system for managing a communication link, comprising:

a common terminal that communicates with both a target terminal and a current terminal and measures a communication characteristic between the common terminal and the target terminal; and a network controller that manages the operation of the current terminal and the target terminal, the network controller establishes a synchronous communication link between the common terminal and the target terminal based on a timing adjustment value derived from the communication characteristic measurement and transitions communication service support for the common terminal from the current terminal to the target terminal, using the synchronous communication link, wherein the network controller establishing the synchronous communication link by changing a mode of communication between the target terminal and the common terminal from an asynchronous mode to a synchronous mode and changing a mode of communication between the current terminal and the common terminal from the synchronous mode to the asynchronous mode.

16. A method of controlling a communication link, comprising:

measuring a first communication characteristic between a common terminal and a target terminal;

establishing a synchronous communication link between the common terminal and the target terminal, the synchronous communication link established in accordance with a timing adjustment value derived from the first communication characteristic measurement, wherein establishing the synchronous communication link includes changing a mode of communication between the target terminal and the common terminal from an asynchronous mode to a synchronous mode and changing a mode of communication between a current terminal and the common terminal from the synchronous mode to the asynchronous mode; and transitioning communication service support for the common terminal from the current terminal to the target terminal using the synchronous communication link.

17. The method of claim 16, wherein establishing the synchronous communication link includes:

activating a communication channel for the synchronous communication link between the target terminal and the common terminal; and synchronizing the common terminal with the synchronous communication link based on the timing adjustment value.

* * * * *